Patented Mar. 11, 1947

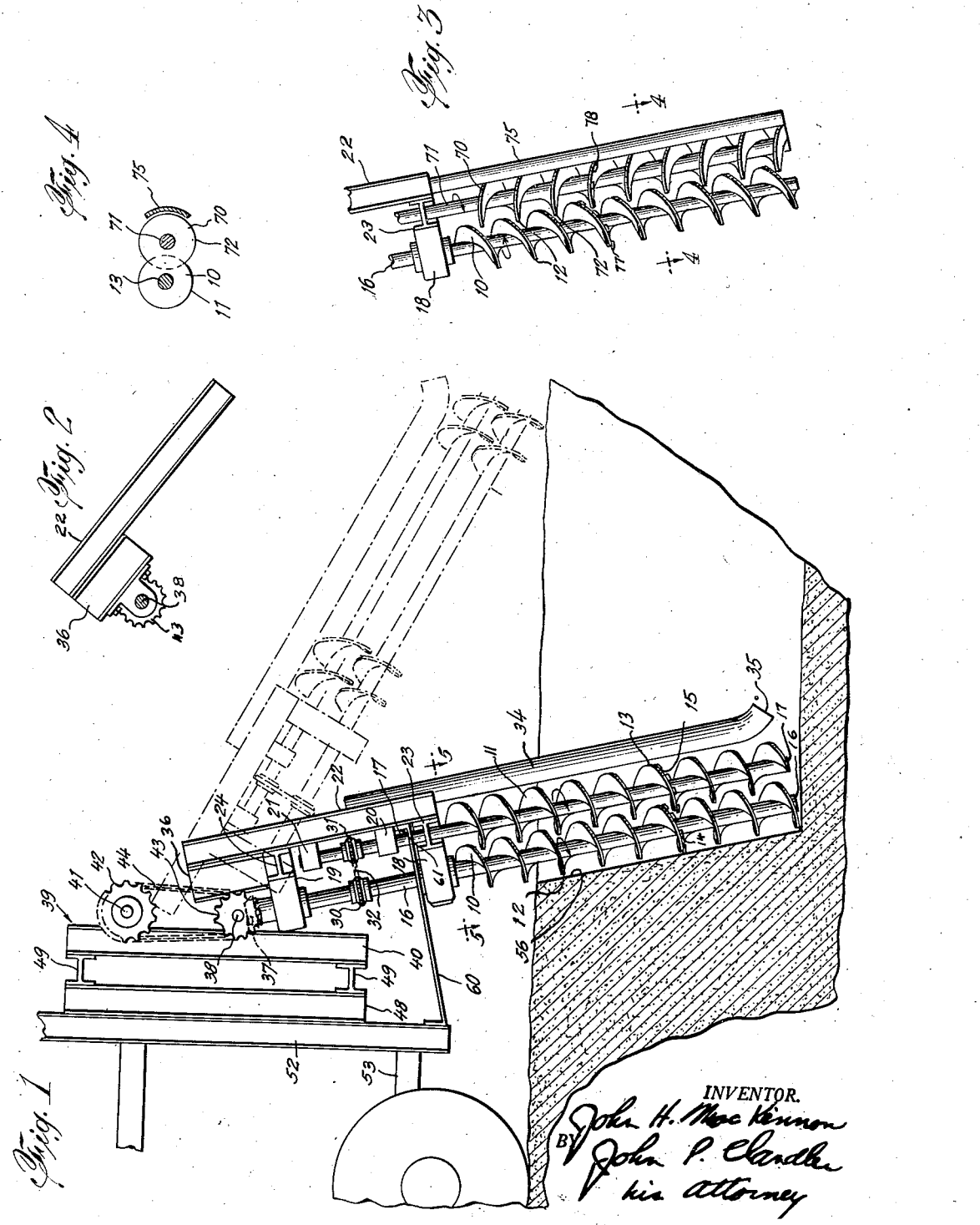

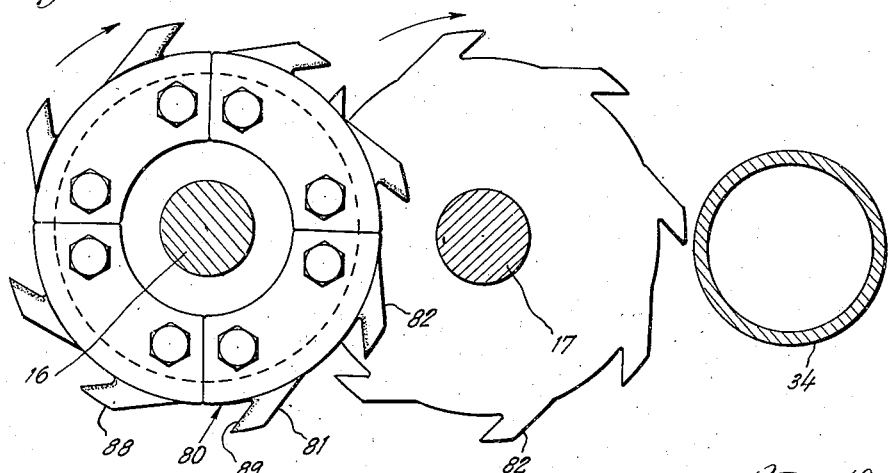
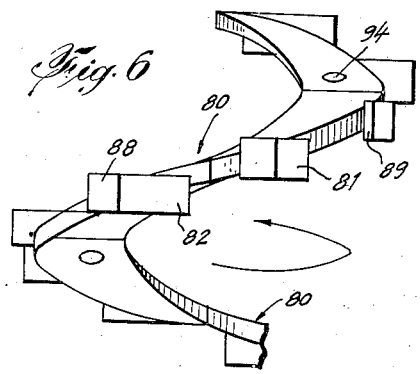
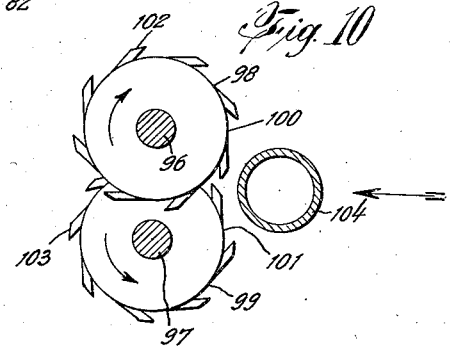
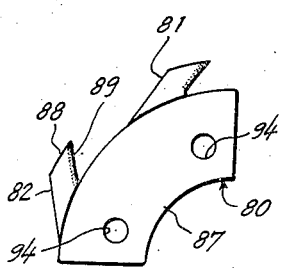
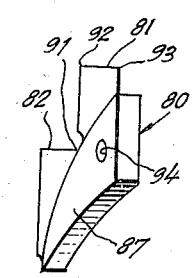
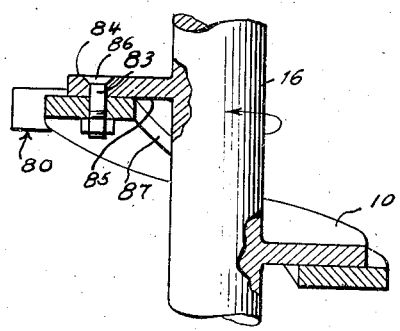

2,417,313

UNITED STATES PATENT OFFICE 2,417,313

TRENCH-DIGGING MACHINE

John H. MacKinnon, Larchmont, N. Y.

Application June 17, 1944, Serial No. 540,869

5 Claims. (Cl. 37—81)

This invention relates to new and useful improvements in trench-cutting devices, and relates more particularly to a spiral cutting element adapted for cutting trenches through various soil formations, the device having means for cleaning the cut material, particularly roots, from the spiral cutting element as the same proceeds through the ground. The invention has particular reference to a combined trench-digging and cable-laying device wherein the spiral cutting element cuts a channel of approved depth in the ground, means being provided for simultaneously laying the cable substantially at the bottom of the trench, without, however, actually removing more than a minimum quantity of the dirt from the trench as the machine proceeds.

The device of the present invention is adapted to be mounted on any suitable truck or tractor having sufficient power to move the entire apparatus over the ground, as well as to rotate the spiral cutting elements.

Spiral trench-digging assemblies wherein the spiral cutting element is forwardly inclined, and the cutting is done by the edges of the spiral element, have been known. They have not been particularly satisfactory, however, for a number of reasons, primarily because the spiral cutter soon becomes clogged with dirt, stones, roots, and the like. The roots below the ground surface, as well as the vines, briars, and other growth above the ground, tend to wind themselves around the spiral cutting element, and it is frequently necessary to stop the operation of the machine and dig by hand around the spiral to remove the accumulated material. This greatly slows down operations, and somewhat better results appear to have been obtained, particularly in cable-laying operations, by simply pulling a large-sized plow through the ground, notwithstanding the enormous amount of motive power required for such an operation.

One particular difficulty with the plow-type of cable-laying device resides in the fact that roots quickly gather along the forward edge of the plow and cause the same to rise to the surface of the ground. In this case, again, it is necessary to laboriously remove the roots and other accumulated material and start the operation all over again. In actual practice, it has usually been found necessary to first run the plow through the ground solely for the purpose of loosening the dirt and stones, and cutting the roots, and then proceed a second time through the same channel, this time, however, laying the cable at the bottom of the trench.

It is an object of the present invention to provide a cable-laying device which may dig the trench and lay the cable in one operation. An important feature of the present invention resides in the provision of novel removable cutting teeth disposed about the periphery of the spiral conveying element. These teeth are so formed as to cut through any type of solidly-packed earth formation, such as hard clay, shale, coral rock, and other sub-surface formations, as well as through roots which have always been a great source of annoyance.

Another important feature of the present invention resides in the provision of self-cleaning means for the spiral cutting element, such means comprising a second spiral element positioned just to the rear of the first spiral, the outer peripheral edges of the rear spiral being disposed inside of the cylinder formed by the outer periphery of the forward spiral cutter.

In another form of the present invention, the two spiral elements are placed side by side rather than one behind the other, the two spiral elements including the cutting teeth intermeshing as before, without, however, one element actually touching the other. This side-by-side arrangement produces somewhat faster cutting action, as will be pointed out more in detail hereinafter.

One of the spiral elements may be formed as a right-hand helix, and the other, as a left-hand helix, and in this instance the two spiral elements must, of necessity, revolve in opposite directions. In other words, the two spiral elements may be considered as intermeshing spiral gears whose teeth, however, never touch. Certain advantages, however, are achieved when both spiral elements are formed as a right-hand helix, or as a left-hand helix, the two spiral elements, in this instance, revolving in the same direction. The advantages achieved by this arrangement will be pointed out more in detail. In either arrangement, the cutting edges or teeth of one cutting element are disposed quite near to the shaft forming the core of the other cutting element, and thus will remove all accumulated material as quickly as the same becomes imbedded or packed between the convolutions of the forward cutting element.

A further object of the present invention resides in the provision of novel supporting means for the cutting assembly wherein no journal support for the lower ends of the spiral cutting elements, or even of the cable chute, is necessary. This is an important feature of the present invention, particularly because any such lower journal support impedes the forward movement of the cutter through the ground.

If the cutting assembly of the present invention is used for a trench-digging as distinguished from strictly cable-laying operations, the cable chute may be removed and a curved shield positioned behind the aft cutter, which shield causes the dirt to be removed from the ground and delivered to the side of the trench.

In the drawings:

Fig. 1 is a broken side elevation of a cable-laying device constructed in accordance with the present invention, the view showing the cutting elements in operative position in full lines, and in inoperative position on the surface of the ground in broken lines.

Fig. 2 is a broken side elevation showing certain details of the pivotal supporting means for the upper end of the cutter assembly.

Fig. 3 is a broken side elevation of a modified form of cutter assembly wherein the forward spiral is formed with a right-hand helix, and the aft spiral with a left-hand helix, the view also showing a shield in place of the cable-laying chute.

Fig. 4 is a section taken on line 4—4 of Fig. 3.

Fig. 5 is an enlarged section taken on line 5—5 of Fig. 1, the view showing certain details of the removable cutting teeth.

Fig. 6 shows a plurality of spirally-arranged cutting teeth.

Fig. 7 is an enlarged side elevation, partially in section, of the spiral element and two of the teeth secured thereto.

Fig. 8 is an elevation of one of the cutting teeth.

Fig. 9 is an end view thereof.

Fig. 10 is a top plan view of a modified form of the invention wherein the two cutting elements are placed side by side rather than one behind the other.

Referring now more particularly to Figs. 1 and 2, it will be noted that the cutter assembly includes a forward spiral element 10 and an aft spiral element 11. The cutting teeth, illustrated more in detail in Figs. 5 to 9, inclusive, are illustrated only in fragmentary fashion in Fig. 1, and for purposes of description the outer peripheral edges 12 of spiral 10, and the outer peripheral edges 13 of spiral 11, may be considered as the actual cutting edges. It may be pointed out in this connection that for digging trenches or laying cable through certain types of relatively soft soil formation known to be free from boulders and roots, the removable cutting teeth could be eliminated. Soil of this type, however, is relatively rare, and spiral elements fitted with the teeth hereinafter described will cut faster through soil formation of any type, and accordingly are preferred. Only a few teeth are shown on each spiral, and these only for the purpose of indicating that the cutting edges are disposed at 14 and 15, respectively, on spirals 10 and 11.

Forward spiral 10 is carried on shaft 16, which is journalled in a pivoted frame assembly including lower journal element 18, and upper journal element 19. Aft spiral 11 is carried on shaft 17, which is journalled at 20 and 21, such journal members being carried by frame member 22, which may be of channelled or I-beam construction, the pivoted frame assembly further including transverse frame members 23 and 24 which support journal members 18 and 19. It will be noted that spirals 10 and 11 are both formed as a right-hand helix, and, accordingly, they should rotate in the same direction. The peripheral cutting edges 12 of forward spiral 10, at their rear, lie inside the cylinder formed by the peripheral edges 13 of helix 11, and, likewise, such peripheral edges 13 of helix 11, at their front, lie inside the cylinder formed by peripheral edges 12 of spiral 10. The distance between cutting edges 13 and shaft 16 forming the core of spiral 10 is a matter of choice, although it is preferred to have such edges positioned approximately an inch from the shaft. It is also of importance to have those portions of edges 13 lying nearest shaft 16 to be spaced substantially equidistant between two convolutions of the spiral.

The particular advantage in providing the two right-hand or left-hand spirals rotating in the same direction resides in the fact that the meeting edges of the two spirals are revolving in opposite directions, and accordingly any accumulated dirt, stones, roots, and the like, which are packed in the forward spiral are removed or cut away as they tend to pass a center line defined by the axes of the two spirals. This prevents the accumulated material from being moved forwardly in the forward spiral.

Shafts 16 and 17 carry sprockets 30 and 31 connected by a chain drive 32. The pivoted frame assembly further carries cable chute 34 which may be of rigid, tubular construction havig a rearwardly-disposed lower terminal, as shown at 35. Both of spirals 10 and 11 continue down to the lower end of shafts 16 and 17, and the lower end 35 of the cable chute is positioned slightly above the lower terminals of such shafts. The pivoted frame assembly further includes a channel member 36, shown in Fig. 2, which is freely pivoted on shaft 38 journalled in fixed frame assembly 39.

At its upper end, shaft 16 is provided with a bevelled gear 37 which meshes with another bevelled gear (not shown) carried on transverse shaft 38. Fixed frame assembly 39 includes vertical frame members 40 which support shafts 38 and 41, each of such shafts carrying sprockets 43 and 42, respectively, connected by a chain drive 44. Frame assembly 39 also includes vertical frame member 48 connected to frame member 40 by transverse members 49. Frame assembly 39 is appropriately bolted to vertical frame member 52, which is carried at the rear of the truck or tractor designated generally by the reference numeral 53. Suitable means (not shown) are provided for vertically adjusting frame assembly 39 relative to frame member 52, in order that when a somewhat deeper trench is to be dug, the frame assembly 39 may be dropped downwardly, and vice versa.

At the beginning of the cutting operation, the cutter assembly may occupy the position shown in broken lines in Fig. 1, wherein the lower end of spiral element 10 is positioned on top of the ground. Rotation of the cutters is then commenced, and the cutter assembly moves downwardly into the ground to the position shown in full lines in Fig. 1, having cut trench designated at 56. Brackets 60, rigidly secured at the lower end of frame members 52, may then be secured by bolts 61 to frame member 22, thus securely positioning the frame element for the spiral cutters at the proper angle for cutting. This angle is a matter of choice, although substantially the angle illustrated in Fig. 1 has given the best results. By lengthening bracket 60, however, this angle may be increased, which would be the case if a shallower trench is desired. Likewise, in the event that a deeper trench is being cut, a different bracket may be substituted for the bracket 60.

In the cutter assembly illustrated in Fig. 3, the forward spiral 10 carried on shaft 16 and journalled at 18 is similar to that shown in Fig. 1. Aft spiral 70 carried on shaft 71, however, is a left-hand spiral, although its outer peripheral edges 72 are similarly disposed within the cylinder of spiral 10, and the peripheral edges 12 of spiral 10 are positioned inside the cylinder of spiral 70, as particularly illustrated in Fig. 4. In view of this right and left helix formation, it will be necessary to rotate both shafts 16 and 71 in opposite directions, which can be accomplished by securing intermeshing spur gears on shafts 16 and 71, the spur gears being not shown.

In Figs. 3 and 4, the cable chute 34 has been removed, and a curved shield 75 has been substituted therefor, such shield being securely affixed to frame member 22. This shield arrangement permits the dirt to be thrown upwardly and out of the ground, and if it is desired to deposit this dirt to the side of the trench, suitable conveyor means (not shown) may be employed. The width of the shield 75 is a matter of choice, and it will be appreciated that if the shield is as wide as the cut trench, all of the dirt will be removed. By providing a shield of lesser width, less of the dirt will be removed. For purposes of clarity, only a few teeth are shown on each of spirals 10 and 71, such teeth having the cutting edges 77 and 78, respectively.

The details of the cutting teeth are illustrated in Figs. 5 to 9, inclusive, Fig. 5 being a section taken on line 5—5 of Fig. 1. When the teeth are secured to the spiral in the manner hereinafter described, the spiral, per se, has no cutting function but rather is merely a conveyor for the cut material, and for clarity hereinafter will be referred to as a spiral conveyor, although in the embodiment of Fig. 1 very little of the material is conveyed longitudinally of the spiral. Each cutting unit, designated generally by the reference numeral 80, may have a plurality of teeth 81 and 82 thereon. The individual units may be secured to the spiral conveyor 10 by means of bolts 83.

In the showing of Fig. 7, 84 represents the upper surface of the spiral, the cutting units 80 thus being mounted on the lower surface 85 thereof. Since the upper surface 84 is the material-carrying surface, it is preferred to have bolt heads 86 counter-sunk. Each cutting unit may extend around the spiral 90°; in other words, four of such units may be secured to each convolution of the spiral. The flange 87 of each cutting unit is generally arcuate in shape, the opposed surfaces thereof conforming generally to the contour of a quarter of a convolution on the spiral element 10. The teeth 82 extend from this flange portion, and the outer periphery 88 of each tooth represents the arc of a circle whose center passes through the axis of the rotating spiral. Each tooth is desirably formed on its forward edge with a hardened surface 89. By forming the teeth in this fashion, the major wear occurs on the outer periphery of each tooth, and especially on the leading edge thereof, which, as aforesaid, has a hardened facing. Accordingly, this wear only serves to reduce the width of the trench which is cut, and therefore the individual teeth may enjoy a relatively long life.

By referring to Fig. 9, it will be noted that the right-hand edge 91 of the lower tooth is in alignment with the left-hand edge 92 of the upper tooth. Also, the right-hand edge 93 of the upper tooth is aligned with the left-hand edge of the first tooth on the cutting unit next adjacent.

Accordingly, it will be seen that the successive teeth on each revolution cut a complete channel. The flange of each cutting unit is further formed with a plurality of apertures 94 which receive bolts 83. By forming flange 87 so that each of its opposed surfaces has the contour of the marginal edge of the spiral conveying element, the cutting units may be reversed. In other words, either side may be secured to the spiral conveyor. It is not imperative that the cutting units be affixed to the lower surface of the spiral conveyor, although experience has shown that best results are obtained when this arrangement is followed.

Both of the spiral elements, including the spiral conveyor and the cutting teeth, are illustrated in Figs. 1, 3 and 4 as being of substantially the same diameter. This is not necessary, however, and in some cases the aft spiral cutting element may be somewhat smaller, since it has more of a cleaning function than a cutting function. In other instances, however, it may be desired to form the forward spiral cutter of smaller diameter in order to reduce the strain on this initial cutting element as it moves through the ground, the aft cutting element simply widening the trench as well as performing its usual cleaning function.

By including forward face 89 of the cutting teeth forwardly at approximately the angle shown, the cutting edges of the teeth are self-sharpening and do not tend to become rounded, as would be the case if this face were substantially parallel with the radius at the point of attachment to the spiral.

In the embodiment of the invention illustrated in Figs. 1 to 5, inclusive, one cutting element was placed to the rear of the first cutting element, the forward cutting element primarily having the function of cutting the trench, and the rear element, the function of cleaning the accumulated material from the forward element. In the showing of Fig. 10, however, the two cutting elements are placed side by side, and their axes are in transverse alignment. This arrangement includes shafts 96 and 97 carrying the spiral elements 98 and 99, respectively. The peripheral edges 100 and 101 of the respective spirals intermesh with each other, as shown, and the cutting teeth 102 and 103 carried by each of the spiral elements approach the shafts 97 and 96, respectively. By revolving the cutting elements in the directions shown, the cut material is pushed rearwardly, and the teeth of each spiral element have accordingly both a cutting and a cleaning function. The cable chute 104 may be positioned to the rear of the two cutting elements, or the shield similar to that shown in Fig. 4 may be employed.

This arrangement has the added advantage over that shown in Fig. 1 in that rotation of the two spirals side by side in the direction indicated very considerably aids in producing forward movement of the cutting apparatus through the soil. That is to say, in the arrangement shown in Fig. 1 wherein the forward cutter is moving in a clockwise direction, viewed from the top, that portion of the cutting element lying to the left of the center is moving in the same direction as the apparatus is moving, thus affording on this side a considerable resistance to forward movement of the apparatus. That portion of the cutting element lying on the right-hand side of the center, of course, moves in the direction opposite to that of the apparatus, thus partially offsetting the resistance afforded by the first-mentioned portion.

In the arrangement of Fig. 10, however, the major portion of the cutting action of both spirals is opposite to the direction of movement of the apparatus, and this movement of the cutting teeth in the direction opposite to that of the apparatus actually aids very considerably in driving the apparatus forward. By placing the two spiral elements as close together as possible without having any actual engagement between the parts, this cumulative action is increased. This arrangement also produces effective cleaning action.

While several forms or embodiments of the invention have been shown and described herein for illustrative purposes, and the construction and arrangement incidental to several specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made, without departing from the principles thereof.

What I claim is:

1. A trench-digging apparatus adapted to be mounted on a power-driven vehicle, said apparatus comprising a frame structure carried by the vehicle, a plurality of substantially parallel shafts journalled in said frame structure, one to the rear of the other, similarly-formed spiral conveyor elements carried by each shaft, means for rotating the spiral elements in the same direction, and cutting teeth carried adjacent the peripheries of each of said spiral conveyor elements, the cutting teeth of each spiral element lying inside the cylinder formed by the cutting teeth of the other spiral element, the cutting teeth of the rear spiral element removing the accumulated material from the forward spiral element.

2. A trench-digging apparatus adapted to be carried on a power-driven vehicle and comprising a fixed frame structure mounted on the rear of the vehicle, and a pivoted frame structure carried by the fixed frame structure, means extending between the frame structures for securing the pivoted frame structure at a desired inclination, a front and a rear spiral conveying element journalled in the pivoted frame structure, the peripheral edges of each spiral element lying inside the cylinder formed by the other spiral element, and removable cutting units carried along the peripheral edges of each spiral element, each unit comprising a flange of arcuate shape whose contour is generally similar to that of the peripheral edges of the spiral element, a plurality of teeth formed integrally with each flange, the cutting edges of the teeth lying generally parallel with the axis of rotation.

3. A spiral cutting apparatus including a spiral conveyor structure and a plurality of cutting units secured along the marginal edges thereof, each unit comprising a flange and a plurality of cutting teeth formed integrally with the flange and extending outwardly therefrom, the flange being of arcuate shape and having a contour corresponding generally to the marginal edge of the spiral conveyor structure, each flange extending over a portion of a convolution of the spiral structure, the cutting teeth having cutting edges lying generally parallel with the axis of rotation of the spiral structure, one edge of each successive cutting tooth, and the adjacent edge of the next succeeding cutting tooth, lying generally in the same plane of rotation of the spiral structure, whereby a substantially complete cylinder is cut on each rotation of the spiral structure.

4. A trench-digging apparatus adapted to be mounted on a power-driven vehicle, said apparatus comprising a frame structure carried by the vehicle, a plurality of substantially parallel shafts journalled in said frame structure, one to the rear of the other, spiral conveyor elements carried by each shaft, means for simultaneously rotating the spiral elements, and cutting teeth carried adjacent the peripheries of each of said spiral conveyor elements, the cutting teeth of each spiral element lying inside the cylinder formed by the cutting teeth of the other spiral element, the cutting teeth of the rear spiral element removing the accumulated material from the forward spiral element.

5. A trench-digging apparatus adapted to be mounted on a power-driven vehicle, said apparatus comprising a frame structure carried by the vehicle, a plurality of substantially parallel shafts journalled in said frame structure, one to the rear of the other, right and left hand spiral conveyor elements carried by the respective shafts, means for rotating the spiral elements in opposite directions, and cutting teeth carried adjacent the peripheries of each of said spiral conveyor elements, the cutting teeth of each spiral element lying inside the cylinder formed by the cutting teeth of the other spiral element, the cutting teeth of the rear spiral element removing the accumulated material from the forward spiral element.

JOHN H. MacKINNON.

REFERENCES CITED

The following references are of record in the file of this patent:

UNITED STATES PATENTS

| Number | Name | Date |
|---|---|---|
| 1,337,184 | Adams | Apr. 20, 1920 |
| 181,887 | Young | Sept. 5, 1876 |
| 322,656 | Titus et al., | July 21, 1885 |
| 1,477,352 | Hughes | Dec. 11, 1923 |
| 1,496,815 | McMeans | June 10, 1924 |
| 2,560,334 | Engel et al. | Oct. 17, 1944 |

FOREIGN PATENTS

| Number | Country | Date |
|---|---|---|
| 43,242 | Sweden | Jan. 3, 1916 |